July 26, 1960
A. D. PALMER
2,946,840
PROTECTIVE WIRE WRAPPING AND METHOD FOR
PROTECTING ELECTRICAL WIRES
Filed Aug. 4, 1955
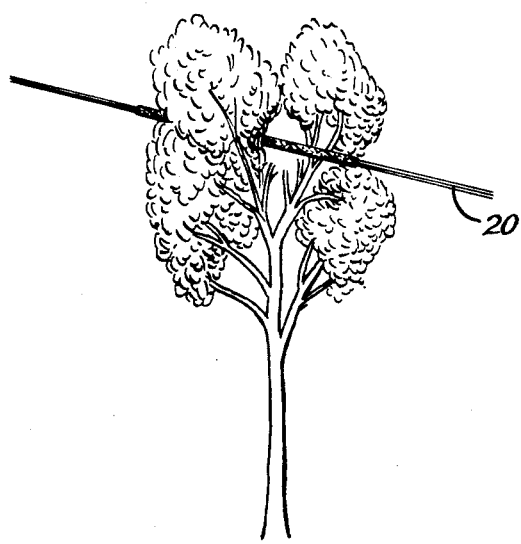
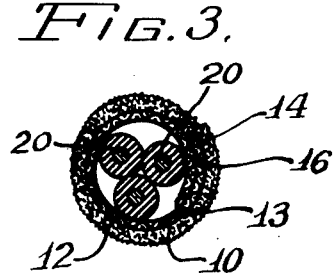
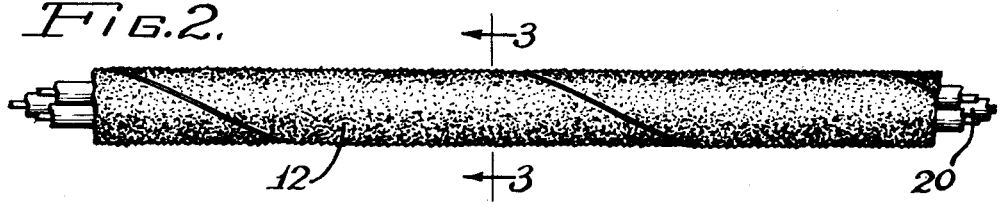
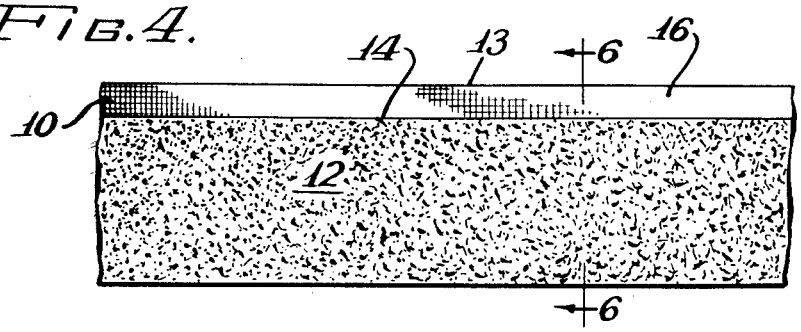
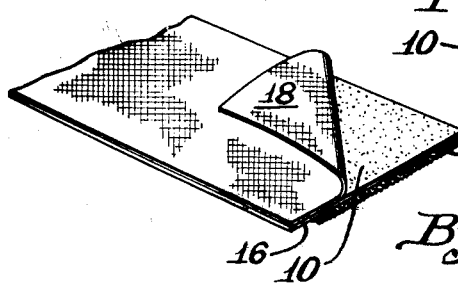
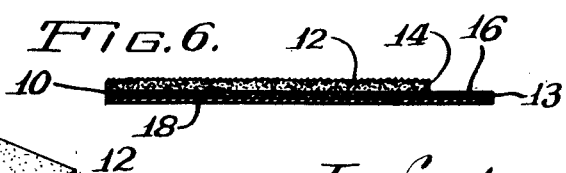
Inventor:
Alvin D. Palmer
By [signature]
Atty.

United States Patent Office 2,946,840
Patented July 26, 1960

2,946,840

PROTECTIVE WIRE WRAPPING AND METHOD FOR PROTECTING ELECTRICAL WIRES

Alvin D. Palmer, 626 S. Austin Blvd., Oak Park, Ill.

Filed Aug. 4, 1955, Ser. No. 526,380

2 Claims. (Cl. 174—136)

My invention relates to a method for protecting electrical wires and to a protective wire wrapping as an article of manufacture.

It should be understood that in this specification the word wires when used will include cables as well as single wire strands.

It is well known that power lines and telephone lines as they run along city streets, off into houses or buildings, and through the country on their respective poles often have to pass through trees. At the time of installation the trees may either have not grown or the growth of the trees interfering with the running of the line is cleared away so as to give the wires unobstructed passage through the trees. However, in the course of time the existing trees fill in again and new trees and bushes are likely to grow up through the wires and pass them eventually. In both cases, the insulation of the wires is soon abraded away and the wires exposed causing power losses and shorting out through the trees in rainstorms and the like. The metal strand itself within the wire is thereafter subject to abrasion and being worn through. Additionally, masses of wood are permitted to develop adjacent the wires which, should they break off in a windstorm, might easily and often do break the wires.

The alternative is continual and expensive trimming of the trees to keep them clear of the wires.

My invention is directed to the very simple but, as far as I know, novel proposition that the trees themselves are composed of abradable material, just as is the insulation of the wires. Therefore, why not let the wires wear away the trees and maintain their own openings therethrough rather than suffer the injury or demand the maintenance above?

A principal object of my invention may therefore be considered to be to so equip telephone and power lines where they pass through trees to maintain their own cleared spaces or passages through the trees by wearing away encroaching tree portions. Another major object of my invention is to provide a material with which such wires may be equipped in the vicinity of trees to accomplish this abrasion of the trees.

Still another object of my invention is to provide a material which may be applied to wires of the type described at any desired place in any desired length to clear openings through trees for the wires and to keep open such passages as the need arises.

Other objects and advantages of my invention will be apparent from the following description and drawings of which:

Fig. 1 is an elevation of a tree showing telephone or power lines passing therethrough equipped with an embodiment of my invention illustrating the effect thereof;

Fig. 2 is an elevation of a section of wire furnished with the article of my invention;

Fig. 3 is a section which may be regarded as being taken substantially along the line 3—3 of Fig. 2 looking in the direction of the arrows;

Fig. 4 is a plan view of the product of my invention prior to application to wires;

Fig. 5 is a view of the back side of the material of Fig. 4; and

Fig. 6 is a section which may be regarded as being taken substantially along the line 6—6 of Fig. 4 looking in the direction of the arrows.

The illustrated embodiment of the product of my invention comprises a fabric backing 10 in the form of a ribbon about three inches wide. The strip may be of any length since it is contemplated that sections thereof will be torn or cut off for use as needed. The fabric should be heavy and strong.

The ribbon is impregnated and coated with a tacky, rubber-like water-proof material, natural or synthetic, having high resistance to weathering. It should have strong pressure-adhesive properties. Such materials are well known and the identification of any one would do injustice to the others. This same material is employed to bond a coating of gravel-like material 12 to one side of the strip, the coating however being spaced about a half an inch from one edge 13 of the strip 14. This gravel-like material 12 should be coarse, sharp-edged and exceedingly hard. In the illustrated embodiment, I employ crushed grinding stones, although it will be evident that there are many abrasive materials meeting these characteristics which may be substituted. To complete the material, a removable protective backing 18 is applied to the coated underside of the ribbon to protect that tacky surface from dirt and dust which might impair its adhesive properties. This material will of course be manufactured and distributed in rolls of any convenient handling size.

Where a wire 20 is menaced by an encroaching tree growth, an appropriate length of the ribbon is removed from the supply roll and the protective backing 18 is removed therefrom. Thereafter the ribbon is simply spirally wrapped about the wire to cover the wire through the region of potential damage and some distance on either side thereof. The wrapping is performed in such fashion that the tacky under-side of the ribbon adheres to the insulation of the wire, and, additionally, each turn of the wrapping overlies the ungraveled bare portion 16 of the top side of the wrapping and adheres thereto, which results in an even surface for the finished wrapping with both edges effectively cemented down despite what failures there might be in adhesion to the wires themselves due to dirt on the wires, etc. The overlapping of turns of the wrapping likewise provides a substantially waterproof sleeve extending over this length of the wire to prevent the entry of water into the wrapping and any deterioration caused thereby.

It is usually the case that the poles supporting the wires carry more than one wire, and the wires are fairly close together. The wires may be wrapped separately where functional interference or possibility of shorting across might result from direct contact of the wires. The wires may be bunched and wrapped together as in Fig. 3, and this is desirable in that less wrapping material and time is called for and the "sawing" section is sturdier. However such wrapping of multiple wires should be avoided except where the wires carry very low voltage.

It will be appreciated from the foregoing description that there are many alternatives possible in the materials which go to make up my invention. Likewise the dimensions employed above should not be regarded as being limitative. Different widths of ribbon are conceivable. Likewise, the spiral wrapping, while having advantages in that it is more easily handled and the curvature of the wrapping material is less and that it is adaptable to any length of wrap, may be substituted by a cylindrical wrap about the wires. Concerning the substitution of materials, there is a product on the market now known as Safety-Tred manufactured by the Minnesota Mining & Manufacturing Company which consists of a flexible fabric having a gravelly coating applied thereto. The particular coating employed again is highly abrasive and is provided with a tacky or adhesive back. The manufacture thereof in ribbons with the granular coating spaced from one edge thereof could accomplish my purpose.

Another alternative readily understood would be to provide an outer coating of such abrasive material directly to an insulated wire or cable for a desired distance or to provide such an abrasive material on the outside of protective tubes or boxes now in common use.

In view of the many alternatives both as to material and method, I prefer that my invention be regarded as being limited only as set forth in the following claims.

I claim:

1. The method of controlling the growth of vegetation in the vicinity of an insulated, above-the-ground electrical transmission line which comprises surrounding the insulation around said line in the vicinity of vegetation, with flexible material which is adhesive to said insulation and has an exterior surface in which an abrasive material is embedded.

2. In combination, an overhead electrical transmission line having a plurality of insulated conductors, sheathing means anchored to and protectively encasing a longitudinal portion of said transmission line to be protected from interfering vegetation, and abrasive means on the exterior of said sheathing means for wearing away vegetation interferingly engaged therewith and moved relative thereto.

References Cited in the file of this patent
UNITED STATES PATENTS

| | | |
|---|---|---|
| 1,214,956 | Rogers | Feb. 6, 1917 |
| 1,781,896 | Diamond | Nov. 18, 1930 |
| 2,129,110 | Weaver | Sept. 6, 1938 |
| 2,258,508 | Kerchner | Oct. 7, 1941 |
| 2,286,208 | Kirchner | June 16, 1942 |
| 2,667,436 | Goepfert et al. | Jan. 26, 1954 |
| 2,714,790 | Lindenborg | Aug. 9, 1955 |
| 2,732,065 | Marchese | Jan. 24, 1956 |
| 2,793,478 | Rohowetz | May 28, 1957 |